United States Patent
Eddy et al.

(10) Patent No.: US 11,620,220 B2
(45) Date of Patent: Apr. 4, 2023

(54) CACHE SYSTEM WITH A PRIMARY CACHE AND AN OVERFLOW CACHE THAT USE DIFFERENT INDEXING SCHEMES

(71) Applicant: VIA ALLIANCE SEMICONDUCTOR CO., LTD., Shanghai (CN)

(72) Inventors: Colin Eddy, Austin, TX (US); Rodney E. Hooker, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 545 days.

(21) Appl. No.: 14/889,113

(22) PCT Filed: Dec. 12, 2014

(86) PCT No.: PCT/IB2014/003159
§ 371 (c)(1),
(2) Date: Nov. 4, 2015

(87) PCT Pub. No.: WO2016/009247
PCT Pub. Date: Jan. 21, 2016

(65) Prior Publication Data
US 2016/0170884 A1 Jun. 16, 2016

Related U.S. Application Data

(60) Provisional application No. 62/024,020, filed on Jul. 14, 2014.

(51) Int. Cl.
*G06F 12/0811* (2016.01)
*G06F 12/1027* (2016.01)
(Continued)

(52) U.S. Cl.
CPC ...... *G06F 12/0811* (2013.01); *G06F 12/0808* (2013.01); *G06F 12/0864* (2013.01);
(Continued)

(58) Field of Classification Search
CPC ............ G06F 12/0811; G06F 12/0808; G06F 12/0864; G06F 12/1027; G06F 12/1045;
(Continued)

(56) References Cited

U.S. PATENT DOCUMENTS 5,386,527 A * 1/1995 Bosshart ............ G06F 12/1054
711/207
5,493,660 A * 2/1996 DeLano ............ G06F 12/1027
711/206

(Continued)

OTHER PUBLICATIONS

PCT/IB2014/003159. International Search Report (ISR) and Written Opinion (WO). Provided by State Intellectual Property Office of the P.R. China, dated Jul. 17, 2015. pp. 1-9.

*Primary Examiner* — Andrew J Cheong
(74) *Attorney, Agent, or Firm* — McClure, Qualey & Rodack, LLP

(57) ABSTRACT

A cache memory system including a primary cache and an overflow cache that are searched together using a search address. The overflow cache operates as an eviction array for the primary cache. The primary cache is addressed using bits of the search address, and the overflow cache is addressed by a hash index generated by a hash function applied to bits of the search address. The hash function operates to distribute victims evicted from the primary cache to different sets of the overflow cache to improve overall cache utilization. A hash generator may be included to perform the hash function. A hash table may be included to store hash indexes of valid entries in the primary cache. The cache memory system may be used to implement a translation lookaside buffer for a microprocessor.

21 Claims, 5 Drawing Sheets

(51) Int. Cl.
*G06F 12/1045* (2016.01)
*G06F 12/0864* (2016.01)
*G06F 12/0808* (2016.01)
*G06F 12/123* (2016.01)

(52) U.S. Cl.
CPC ...... *G06F 12/1027* (2013.01); *G06F 12/1045* (2013.01); *G06F 12/123* (2013.01); *G06F 2212/1021* (2013.01); *G06F 2212/683* (2013.01)

(58) Field of Classification Search
CPC .......... G06F 12/123; G06F 2212/1021; G06F 2212/681; G06F 2212/683; G06F 2212/69; G06F 12/0215; G06F 12/1018
See application file for complete search history.

(56) References Cited

U.S. PATENT DOCUMENTS

| | | | | |
|---|---|---|---|---|
| 5,526,510 A * | 6/1996 | Akkary | G06F 12/0831 | 710/57 |
| 5,592,634 A * | 1/1997 | Circello | G06F 9/3806 | 365/221 |
| 5,603,004 A * | 2/1997 | Kurpanek | G06F 12/0864 | 711/118 |
| 5,717,885 A * | 2/1998 | Kumar | G06F 12/1027 | 711/207 |
| 5,752,274 A * | 5/1998 | Garibay, Jr. | G06F 12/1027 | 711/122 |
| 5,754,819 A * | 5/1998 | Lynch | G06F 12/0864 | 711/202 |
| 5,860,117 A | 1/1999 | Cherabuddi | | |
| 6,044,478 A * | 3/2000 | Green | G06F 12/0815 | 711/141 |
| 6,065,091 A * | 5/2000 | Green | G06F 12/1054 | 365/49.16 |
| 6,223,256 B1 * | 4/2001 | Gaither | G06F 12/126 | 711/118 |
| 6,823,471 B1 * | 11/2004 | Arimilli | G06F 11/20 | 714/10 |
| 7,124,249 B1 * | 10/2006 | Darcy | G06F 12/0864 | 711/122 |
| 7,136,967 B2 | 11/2006 | Sawdey | | |
| 7,444,473 B1 * | 10/2008 | Koster | G06F 12/0811 | 711/119 |
| 7,478,197 B2 * | 1/2009 | Shen | G06F 12/0811 | 711/117 |
| 7,606,994 B1 * | 10/2009 | Cypher | G06F 12/0864 | 711/118 |
| 7,793,047 B2 * | 9/2010 | Asano | G06F 12/0811 | 711/122 |
| 7,853,752 B1 * | 12/2010 | Agarwal | G06F 12/0811 | 711/120 |
| 7,996,650 B2 * | 8/2011 | Eddy | G06F 9/383 | 711/205 |
| 8,327,187 B1 * | 12/2012 | Metcalf | G06F 15/16 | 714/10 |
| 9,176,880 B2 * | 11/2015 | Lee | G06F 12/0864 | |
| 9,274,959 B2 * | 3/2016 | Habermann | G06F 12/0811 | |
| 2002/0129220 A1 * | 9/2002 | Fields, Jr. | G06F 12/0811 | 711/216 |
| 2003/0182539 A1 * | 9/2003 | Kunkel | G06F 9/383 | 712/225 |
| 2005/0080986 A1 * | 4/2005 | Park | G06F 12/0246 | 711/103 |
| 2005/0125592 A1 * | 6/2005 | Sawdey | G06F 12/0864 | 711/3 |
| 2006/0236074 A1 * | 10/2006 | Williamson | G06F 12/1054 | 711/216 |
| 2007/0094450 A1 * | 4/2007 | VanderWiel | G06F 12/126 | 711/133 |
| 2008/0120467 A1 | 5/2008 | Asano et al. | | |
| 2010/0011188 A1 * | 1/2010 | Eddy | G06F 9/383 | 711/207 |
| 2010/0049952 A1 * | 2/2010 | Eddy | G06F 9/3834 | 712/223 |
| 2010/0064107 A1 * | 3/2010 | Eddy | G06F 12/0811 | 711/146 |
| 2010/0100685 A1 * | 4/2010 | Kurosawa | G06F 12/1054 | 711/128 |
| 2010/0332786 A1 * | 12/2010 | Grohoski | G06F 9/3851 | 711/207 |
| 2011/0219208 A1 * | 9/2011 | Asaad | G06F 15/76 | 712/12 |
| 2011/0231593 A1 * | 9/2011 | Yasufuku | G06F 12/1027 | 711/3 |
| 2012/0005454 A1 * | 1/2012 | Waugh | G06F 12/1027 | 711/207 |
| 2012/0124921 A1 | 5/2012 | Shiao et al. | | |
| 2012/0198121 A1 * | 8/2012 | Bell, Jr. | G06F 12/0864 | 711/3 |
| 2012/0254549 A1 | 10/2012 | Hutchison et al. | | |
| 2012/0260075 A1 * | 10/2012 | Henry | G06F 9/30174 | 712/225 |
| 2013/0019080 A1 * | 1/2013 | Levinsky | G06F 12/1027 | 711/206 |
| 2013/0262767 A1 * | 10/2013 | Lih | G06F 12/0811 | 711/120 |
| 2013/0332434 A1 * | 12/2013 | Sompolski | G06F 17/30466 | 707/701 |
| 2014/0082284 A1 * | 3/2014 | Abella Ferrer | G06F 12/0864 | 711/119 |

* cited by examiner

CACHE SYSTEM WITH A PRIMARY CACHE AND AN OVERFLOW CACHE THAT USE DIFFERENT INDEXING SCHEMES

CROSS-REFERENCE TO RELATED APPLICATIONS

This application claims the benefit of U.S. Provisional Applications Ser. No. 62/024,020, filed on Jul. 14, 2014 which is hereby incorporated by reference in its entirety for all intents and purposes.

BACKGROUND OF THE INVENTION

Field of the Invention

The present invention relates in general to microprocessor caching systems, and more particularly to a caching system with a primary cache and an overflow cache using different indexing schemes.

Description of the Related Art

Modern microprocessors include a memory cache system for reducing memory access latency and improving overall performance. System memory is external to the microprocessor and accessed via a system bus or the like so that system memory access is relatively slow. Generally, a cache is a smaller, faster local memory component that transparently stores data retrieved from the system memory in accordance with prior requests so that future requests for the same data may be retrieved more quickly. The cache system itself is typically configured in a hierarchical manner with multiple cache levels, such as including a smaller and faster first-level (L1) cache memory and a somewhat larger and slower second-level (L2) cache memory. Although additional levels may be provided, they are not discussed further since additional levels operate relative to each other in a similar manner, and since the present disclosure primarily concerns the configuration of the L1 cache.

When the requested data is located in the L1 cache invoking a cache hit, the data is retrieved with minimal latency. Otherwise, a cache miss occurs in the L1 cache and the L2 cache is searched for the same data. The L2 cache is a separate cache array in that it is searched separately from the L1 cache. Also, the L1 cache is typically smaller and faster than the L2 cache with fewer sets and/or ways. When the requested data is located in the L2 cache invoking a cache hit in the L2 cache, the data is retrieved with increased latency as compared to the L1 cache. Otherwise, if a cache miss occurs in the L2 cache, then the data is retrieved from higher cache levels and/or system memory with significantly greater latency as compared to the cache memory.

The retrieved data from either the L2 cache or the system memory is stored in the L1 cache. The L2 cache serves as an "eviction" array in that an entry evicted from the L1 cache is stored in the L2 cache. Since the L 1 cache is a limited resource, the newly retrieved data may displace or evict an otherwise valid entry in the L1 cache, referred to as a "victim." The victims of the L1 cache are thus stored in the L2 cache, and any victims of the L2 cache are stored in higher levels, if any, or otherwise discarded. Various replacement policies may be implemented, such as least-recently used (LRU) or the like as understood by those of ordinary skill in the art.

Many modern microprocessors also include virtual memory capability, and in particular, a memory paging mechanism. As is well known in the art, the operating system creates page tables that it stores in system memory that are used to translate virtual addresses into physical addresses. The page tables may be arranged in a hierarchical fashion, such as according to the well-known scheme employed by x86 architecture processors as described in Chapter 3 of the IA-32 Intel Architecture Software Developer's Manual, Volume 3A: System Programming Guide, Part 1, June 2006, which is hereby incorporated by reference in its entirety for all intents and purposes. In particular, page tables include page table entries (PTE), each of which stores a physical page address of a physical memory page and attributes of the physical memory page. The process of taking a virtual memory page address and using it to traverse the page table hierarchy to finally obtain the PTE associated with the virtual address in order to translate the virtual address to a physical address is commonly referred to as a tablewalk.

The latency of a physical system memory access is relatively slow, so that the tablewalk is a relatively costly operation since it involves potentially multiple accesses to physical memory. To avoid incurring the time associated with a tablewalk, processors commonly include a translation lookaside buffer (TLB) caching scheme that caches the virtual to physical address translations. The size and configuration of the TLB impacts performance. A typical TLB configuration may include an L1 TLB and a corresponding L2 TLB. Each TLB is generally configured as an array organized as multiple sets (or rows), in which each set has multiple ways (or columns). As with most caching schemes, the L1 TLB is typically smaller than the L2 TLB with fewer sets and ways, so that it is also faster. Although smaller and faster, it is desired to further reduce the size of the L1 TLB without significantly impacting performance.

The present invention is described herein with reference to TLB caching schemes and the like, where it is understood that the principles and techniques equally apply to any type of microprocessor caching scheme.

SUMMARY OF THE INVENTION

A cache memory system according to one embodiment includes a primary cache and an overflow cache that are searched together using a search address. The overflow cache operates as an eviction array for the primary cache. The primary cache is addressed using bits of the search address, and the overflow cache is addressed by a hash index generated by a hash function applied to bits of the search address. The hash function operates to distribute victims evicted from the primary cache to different sets of the overflow cache to improve overall cache utilization.

A hash generator may be used to perform the hash function to provide the hash index. A tag evicted from the primary cache may be provided to the hash generator to generate a victim hash index for storing the evicted tag into the overflow cache. Alternatively, a hash table may store hash indexes for valid entries within the primary cache. In this case, a retrieved address from an external location as a result of a miss includes an index and a tag that is stored in the primary cache at a location addressed by the index. The retrieved address is provided to the hash generator for generating a hash index that is stored in the hash table at a location addressed by the index of the retrieved address. If there is a victim evicted from the primary cache, it is combined with a primary index to form a victim address, and a corresponding victim hash is evicted from the hash table.

The victim address is stored in the overflow cache at a location addressed by the victim hash.

The cache memory system may be used to implement a level one (L1) translation lookaside buffer (TLB) cache for a microprocessor. The search address may be a virtual address that corresponds with a physical address to a page of system memory. The microprocessor may further include a level two (L2) TLB and a tablewalk engine. The L1 TLB may be configured as set-associative with multiple sets and ways. The use of a different indexing scheme for the overflow cache increases utilization of the sets of the TLB and allows a reduction in overall L1TLB cache size.

A method of caching data according to one embodiment includes using a first set of bits of a virtual address as a primary index, generating a hash index from a second set of bits of the virtual address, searching a primary cache using the primary index, and while searching the primary cache, also searching an overflow cache of the primary cache using the hash index.

BRIEF DESCRIPTION OF THE DRAWINGS

The benefits, features, and advantages of the present invention will become better understood with regard to the following description, and accompanying drawings where.

DETAILED DESCRIPTION

It is desired to reduce the size of the L1 TLB cache array without substantially impacting performance. The inventors have recognized the inefficiencies associated with conventional L1 TLB configurations. For example, the code of most application programs are unable to maximize utilization of the L1 TLB, such that very often a few sets are over-utilized whereas other sets are under-utilized.

The inventors have therefore developed a cache system with a primary cache and an overflow cache that use different indexing schemes that improves cache memory utilization. The cache system includes an overflow cache (or L1.5 cache) that serves as an extension to a primary cache array (or L1.0 cache) during cache search, but that also serves as an eviction array for the L1.0 cache. Furthermore, the combined cache configuration is significantly smaller than the conventional L1 cache configuration while achieving similar performance. The overflow cache array, or L1.5 cache, is different than a normal eviction array (such as the L2 cache) in that it does not use the same indexing function as the primary L1.0 cache. Instead, it uses a hashed indexing function that changes the locality of the evicted entry or victim, so that it produces improved retention as compared to the larger and conventionally configured L1 cache. For example, the entries that are evicted from the ways of a given set of the L1.0 primary cache are distributed to different sets of the L1.5 overflow cache to improve utilization of the sets and to improve retention of evicted entries. Depending upon the hash function, it can allow for much more than the combined number of ways for a given normal address index.

As described herein, a TLB configuration is configured according to the improved cache system to include an overflow TLB (or L1.5 TLB) that serves as an extension to a primary L1 TLB (or L1.0 TLB) during cache search, but that also serves as an eviction array for the L1.0 TLB. The combined TLB configuration is significantly smaller than the conventional L1 TLB configuration while achieving similar performance. The primary L1.0 TLB uses a first type of index, such as a conventional virtual address index, whereas the overflow L1.5 TLB array uses a hashed indexing function that changes the locality of the evicted page. The combined TLB configuration produces improved retention as compared to the larger and conventionally configured L1 TLB. Although the present invention is described herein with reference to TLB caching schemes and the like, it is understood that the principles and techniques equally apply to any type of hierarchical microprocessor caching scheme.

Figure 1:
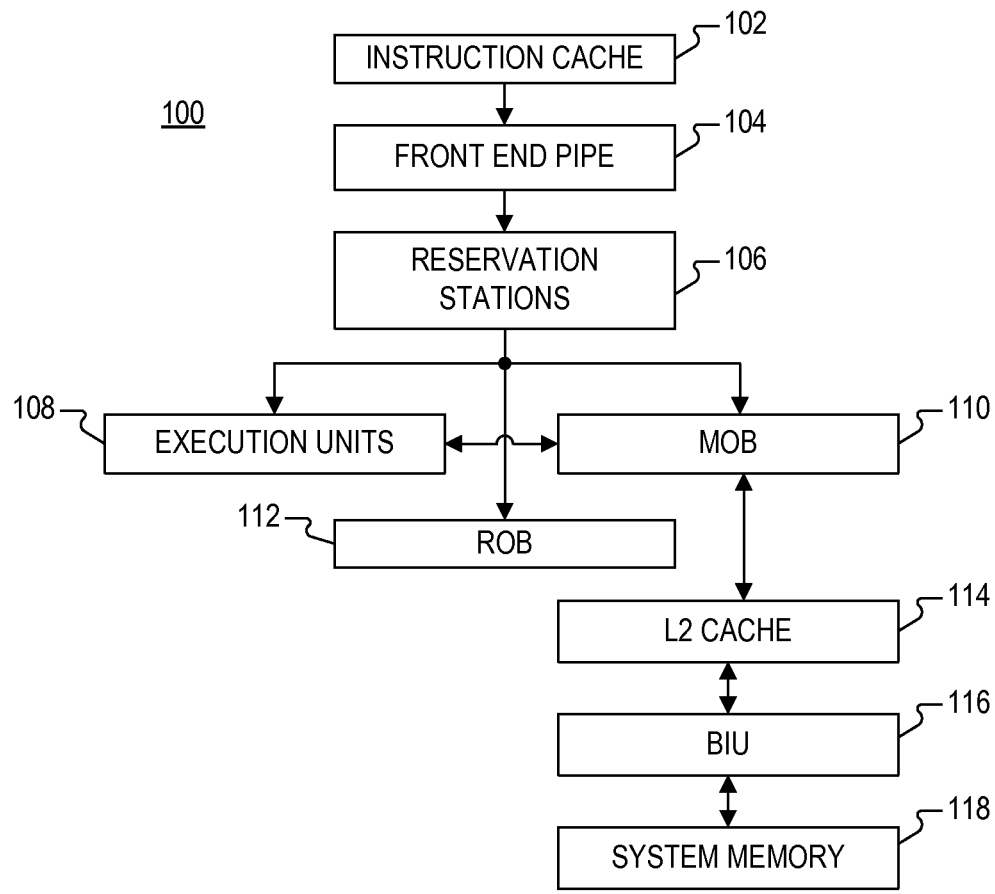
FIG. 1 is a simplified block diagram of a microprocessor including a cache memory system implemented according to an embodiment of the present invention.

FIG. 1 is a simplified block diagram of a microprocessor 100 including a cache memory system implemented according to an embodiment of the present invention. The macroarchitecture of the microprocessor 100 may be an x86 macroarchitecture in which it can correctly execute a majority of the application programs that are designed to be executed on an x86 microprocessor. An application program is correctly executed if its expected results are obtained. In particular, the microprocessor 100 executes instructions of the x86 instruction set and includes the x86 user-visible register set. The present invention is not limited to x86 architectures, however, in which microprocessor 100 may be according to any alternative architecture as known by those of ordinary skill in the art.

In the illustrated embodiment, the microprocessor 100 includes an instruction cache 102, a front end pipe 104, reservations stations 106, executions units 108, a memory order buffer (MOB) 110, a reorder buffer (ROB) 112, a level-2 (L2) cache 114, and a bus interface unit (BIU) 116 for interfacing and accessing system memory 118. The instruction cache 102 caches program instructions from the system memory 118. The front end pipe 104 fetches program instructions from the instruction cache 102 and decodes them into microinstructions for execution by the microprocessor 100. The front end pipe 104 may include a decoder (not shown) and a translator (not shown) that collectively decode and translate macroinstructions into one or more microinstructions. In one embodiment, instruction translation translates macroinstructions of a macroinstruction set of the microprocessor 100 (such as the x86 instruction set architecture) into microinstructions of a microinstruction set architecture of the microprocessor 100. For example, a memory access instruction may be decoded into a sequence of microinstructions that includes one or more load or store microinstructions. The present disclosure primarily concerns load and store operations and corresponding microinstructions, which are simply referred to herein as load and store instructions. In other embodiments, the load and store instructions may be part of the native instruction set of the microprocessor 100. The front end pipe 104 may also include a register alias table (RAT) (not shown) that generates dependency information for each instruction based on its program order, on the operand sources it specifies, and on renaming information.

The front end pipe 104 dispatches the decoded instructions and their associated dependency information to the reservation stations 106. The reservation stations 106 include queues that hold the instructions and dependency information received from the RAT. The reservation stations 106 also included issue logic that issues the instructions from the queues to the execution units 108 and the MOB 110 when they are ready to be executed. An instruction is ready to be issued and executed when all of its dependencies are resolved. In conjunction with dispatching an instruction, the RAT allocates an entry in the ROB 112 for the instruction. Thus, the instructions are allocated in program order into the ROB 112, which may be configured as a circular queue to guarantee that the instructions are retired in program order. The RAT also provides the dependency information to the ROB 112 for storage in the instruction's entry therein. When the ROB 112 replays an instruction, it provides the dependency information stored in the ROB entry to the reservation stations 106 during the replay of the instruction.

The microprocessor 100 is superscalar and includes multiple execution units and is capable of issuing multiple instructions to the execution units in a single clock cycle. The microprocessor 100 is also configured to perform out-of-order execution. That is, the reservation stations 106 may issue instructions out of the order specified by the program that includes the instructions. Superscalar out-of-order execution microprocessors typically attempt to maintain a relatively large pool of outstanding instructions so that they can take advantage of a larger amount of instruction parallelism. The microprocessor 100 may also perform speculative execution of instructions in which it executes instructions, or at least performs some of the actions prescribed by the instruction, before it is known for certain whether the instruction will actually complete. An instruction may not complete for a variety of reasons, such as a mis-predicted branch instruction, exceptions (interrupts, page faults, divide by zero conditions, general protection errors, etc.), and so forth. Although the microprocessor 100 may perform some of the actions prescribed by the instruction speculatively, the microprocessor does not update the architectural state of the system with the results of an instruction until it is known for certain that the instruction will complete.

The MOB 110 handles interfaces with the system memory 118 via the L2 cache 114 and the BIU 116. The BIU 116 interfaces the microprocessor 100 to a processor bus (not shown) to which the system memory 118 and other devices, such as a system chipset, are coupled. The operating system running on the microprocessor 100 stores page mapping information in the system memory 118, which the microprocessor 100 reads and writes to perform tablewalks, as further described herein. The execution units 108 execute the instructions when issued by the reservation stations 106. In one embodiment, the execution units 108 may include all of the execution units of the microprocessor, such as arithmetic logic units (ALUs) and the like. In the illustrated embodiment, the MOB 110 incorporates the load and store execution units for executing load and store instructions for accessing the system memory 118 as further described herein. The execution units 108 interface the MOB 110 when accessing the system memory 118.

Figure 2:
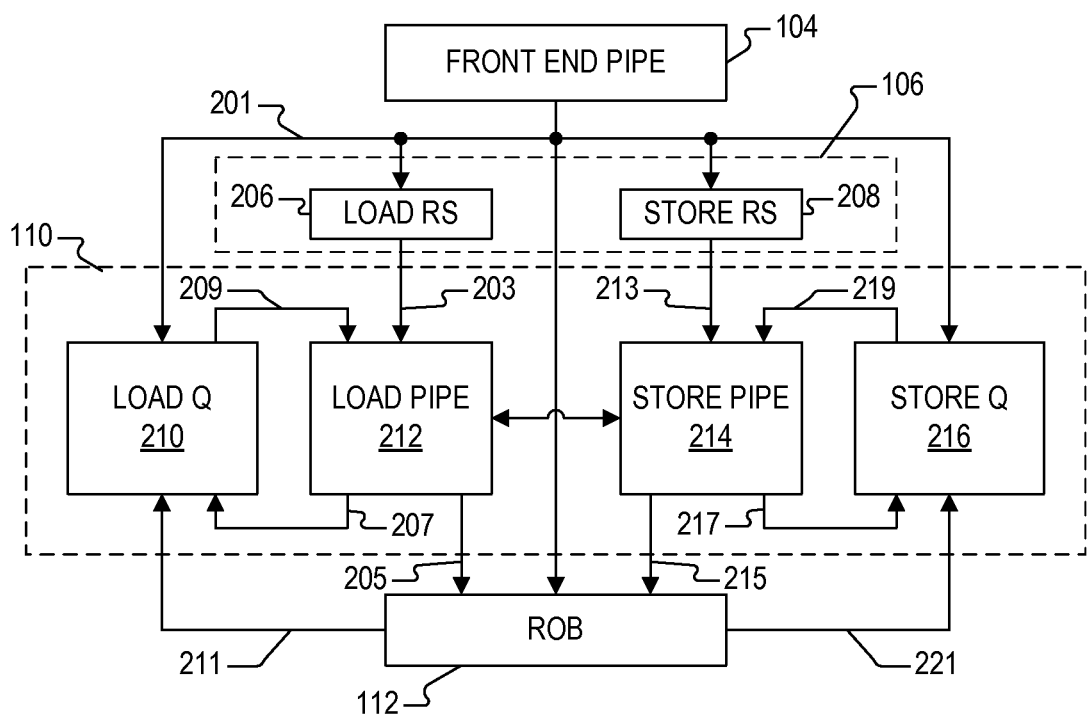
FIG. 2 is a slightly more detailed block diagram illustrating the interfaces between the front end pipe, the reservations stations, a portion of the MOB, and the ROB of the microprocessor of FIG. 1.

FIG. 2 is a slightly more detailed block diagram illustrating the interfaces between the front end pipe 104, the reservations stations 106, a portion of the MOB 110, and the ROB 112. In this configuration, the MOB 110 generally operates to receive and execute both load and store instructions. The reservations stations 106 is shown divided into a load reservation station (RS) 206 and a store RS 208. The MOB 110 includes a load queue (load Q) 210 and a load pipe 212 for load instructions and further includes a store pipe 214 and a store Q 216 for store instructions. In general, the MOB 110 resolves load addresses for load instructions and resolves store addresses for store instructions using the source operands specified by the load and store instructions. The sources of the operands may be architectural registers (not shown), constants, and/or displacements specified by the instruction. The MOB 110 also reads load data from a data cache at the computed load address. The MOB 110 also writes store data to the data cache at the computed store address.

The front end pipe 104 has an output 201 that pushes load and store instruction entries in program order, in which the load instructions are loaded in order into the load Q 210, the load RS 206 and the ROB 112. The load Q 210 stores all active load instructions in the system. The load RS 206 schedules execution of the load instructions, and when "ready" for execution, such as when its operands are available, the load RS 206 pushes the load instruction via output 203 into the load pipe 212 for execution. Load instructions may be performed out of order and speculatively in the illustrated configuration. When the load instruction has completed, the load pipe 212 provides a complete indication 205 to the ROB 112. If for any reason the load instruction is unable to complete, the load pipe 212 instead issues an incomplete indication 207 to the load Q 210, so that the load Q 210 now controls the status of the uncompleted load instruction. When the load Q 210 determines that the uncompleted load instruction can be replayed, it sends a replay indication 209 to the load pipe 212 where the load instruction is re-executed (replayed), though this time the load instruction is loaded from the load Q 210. The ROB 112 ensures in-order retirement of instructions in the order of the original program. When a completed load instruction is ready to be retired, meaning that it is the oldest instruction in the ROB 112 in program order, the ROB 112 issues a retirement indication 211 to the load Q 210 and the load instruction is effectively popped from the load Q 210.

The store instruction entries are pushed in program order into the store Q 216, the store RS 208 and the ROB 112. The store Q 216 stores all active stores in the system. The store RS 208 schedules execution of the store instructions, and when "ready" for execution, such as when its operands are available, the store RS 208 pushes the store instruction via output 213 into the store pipe 214 for execution. Although store instructions may be executed out of program order, they are not committed speculatively. A store instruction has an execution phase in which it generates its addresses, does exception checking, gains ownership of the line, etc., which may be done speculatively or out-of-order. The store instruction then has its commit phase where it actually does the data write which is not speculative or out-of-order. Store and load instructions compare against each other when being executed. When the store instruction has completed, the store pipe 214 provides a complete indication 215 to the ROB 112. If for any reason the store instruction is unable to complete, the store pipe 214 instead issues an incomplete indication 217 to the store Q 216 so that the store Q 216 now controls the status of the uncompleted store instruction. When the store Q 216 determines that the uncompleted store instruction can be replayed, it sends a replay indication 219 to the store pipe 214 where the store instruction is re-executed (replayed), though this time the store instruction is loaded from the store Q 216. When a completed store instruction is ready to be retired, the ROB 112 issues a retirement indication 221 to the store Q 216 and the store instruction is effectively popped from the store Q 216.

Figure 3:
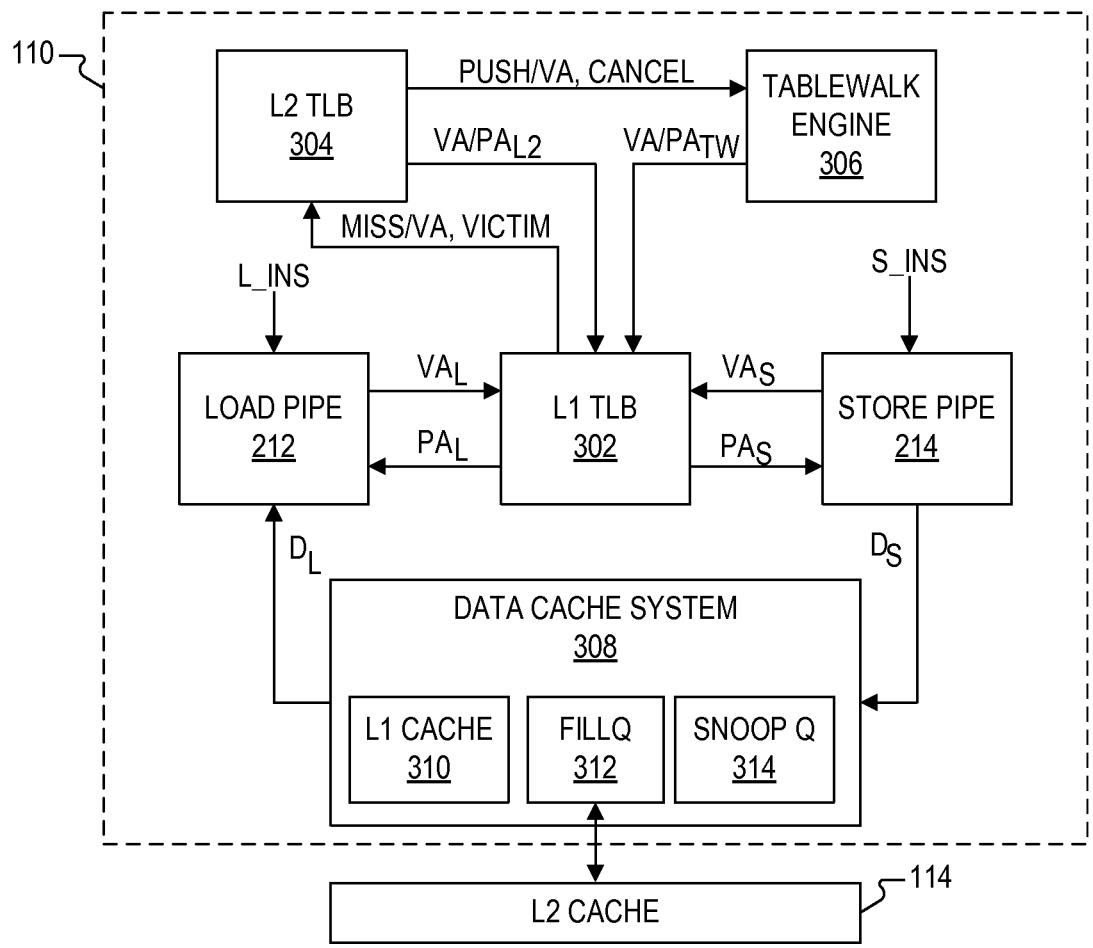
FIG. 3 is a simplified block diagram of portions of the MOB for providing a virtual address (VA) and retrieving a corresponding physical address (PA) of a requested data location in the system memory of the microprocessor of FIG. 1.

FIG. 3 is a simplified block diagram of portions of the MOB 110 for providing a virtual address (VA) and retrieving a corresponding physical address (PA) of a requested data location in the system memory 118. A virtual address space is referenced using a set of virtual addresses (also known as "linear" addresses or the like) that an operating system makes available to a given process. The load pipe 212 is shown receiving a load instruction L_INS and the store pipe 214 is shown receiving a store instruction S_INS, in which both L_INS and S_INS are memory access instructions for data ultimately located at corresponding physical addresses in the system memory 118. In response to L_INS, the load pipe 212 generates a virtual address, shown as $VA_L$. Similarly, in response to S_INS, the store pipe 214 generates a virtual address, shown as $VA_S$. The virtual addresses $VA_L$ and $VA_S$ may be generally referred to as search addresses for searching the cache memory system (e.g., TLB cache system) for data or other information that corresponds with the search address (e.g., physical addresses that correspond with the virtual addresses). In the illustrated configuration, the MOB 110 includes a level-1 translation lookaside buffer (L1 TLB) 302 which caches a limited number of physical addresses for corresponding virtual addresses. In the event of a hit, the L1 TLB 302 outputs the corresponding physical address to the requesting device. Thus, if $VA_L$ generates a hit, then the L1 TLB 302 outputs a corresponding physical address $PA_L$ for the load pipe 212, and if $VA_S$ generates a hit, then the L1 TLB 302 outputs a corresponding physical address $PA_S$ for the store pipe 214.

The load pipe 212 may then apply the retrieved physical address $PA_L$ to a data cache system 308 for accessing the requested data. The cache system 308 includes a data L1 cache 310, and if the data corresponding with the physical address $PA_L$ is stored therein (a cache hit), then the retrieved data, shown as $D_L$, is provided to the load pipe 212. If the L1 cache 310 suffers a miss such that the requested data $D_L$ is not stored in the L1 cache 310, then ultimately the data is retrieved either from the L2 cache 114 or the system memory 118. The data cache system 308 further includes a FILLQ 312 that interfaces the L2 cache 114 for loading cache lines into the L2 cache 114. The data cache system 308 further includes a snoop Q 314 that maintains cache coherency of the L1 and L2 caches 310 and 114. Operation is similar for the store pipe 214, in which the store pipe 214 uses the retrieved physical address $PA_S$ to store corresponding data $D_S$ into the memory system (L1, L2 or system memory) via the data cache system 308. Operation of the data cache system 308 and interfacing the L2 cache 114 and the system memory 118 is not further described. It is nonetheless understood that the principles of the present invention may equally be applied to the data cache system 308 in an analogous manner.

The L1 TLB 302 is a limited resource so that initially, and periodically thereafter, the requested physical address corresponding to the virtual address is not stored therein. If the physical address is not stored, then the L1 TLB 302 asserts a "MISS" indication to the L2 TLB 304 along with the corresponding virtual address VA (either $VA_L$ or $VA_S$) to determine whether it stores the physical address corresponding with the provided virtual address. Although the physical address may be stored within the L2 TLB 304, it nonetheless pushes a tablewalk to a tablewalk engine 306 along with the provided virtual address (PUSH/VA). The tablewalk engine 306 responsively initiates a tablewalk in order to obtain the physical address translation of the virtual address VA missing in the L1 and L2 TLBs. The L2 TLB 304 is larger and stores more entries but is slower than the L1 TLB 302. If the physical address, shown as $PA_L$, corresponding with the virtual address VA is found within the L2 TLB 304, then the corresponding tablewalk operation pushed into the tablewalk engine 306 is canceled, and the virtual address VA and the corresponding physical address $PA_{L2}$ is provided to the L1 TLB 302 for storage therein. An indication is provided back to the requesting entity, such as the load pipe 212 (and/or the load Q 210) or the store pipe 214 (and/or the store Q 216), so that a subsequent request using the corresponding virtual address allow the L1 TLB 302 to provide the corresponding physical address (e.g., a hit).

If instead the request also misses in the L2 TLB 304, then the tablewalk process performed by the tablewalk engine 306 eventually completes and provides the retrieved physical address, shown as $PA_{TW}$ (corresponding with the virtual address VA), back to the L1 TLB 302 for storage therein. When a miss occurs in the L1 TLB 304 such that the physical address is provided by either the L2 TLB 304 or the tablewalk engine 306, and if the retrieved physical address evicts an otherwise valid entry within the L1 TLB 302, then the evicted entry or "victim" is stored in the L2 TLB. Any victim of the L2 TLB 304 is simply pushed out in favor of the newly acquired physical address.

The latency of each access to the physical system memory 118 is slow, so that the tablewalk process, which may involve multiple system memory 118 accesses, is a relatively costly operation. The L1 TLB 302 is configured in such a manner to improve performance as compared to conventional L1 TLB configurations as further described herein. In one embodiment, the size of the L1 TLB 302 is smaller with less physical storage locations than a corresponding conventional L1 TLB, but achieves similar performance for many program routines as further described herein.

Figure 4:
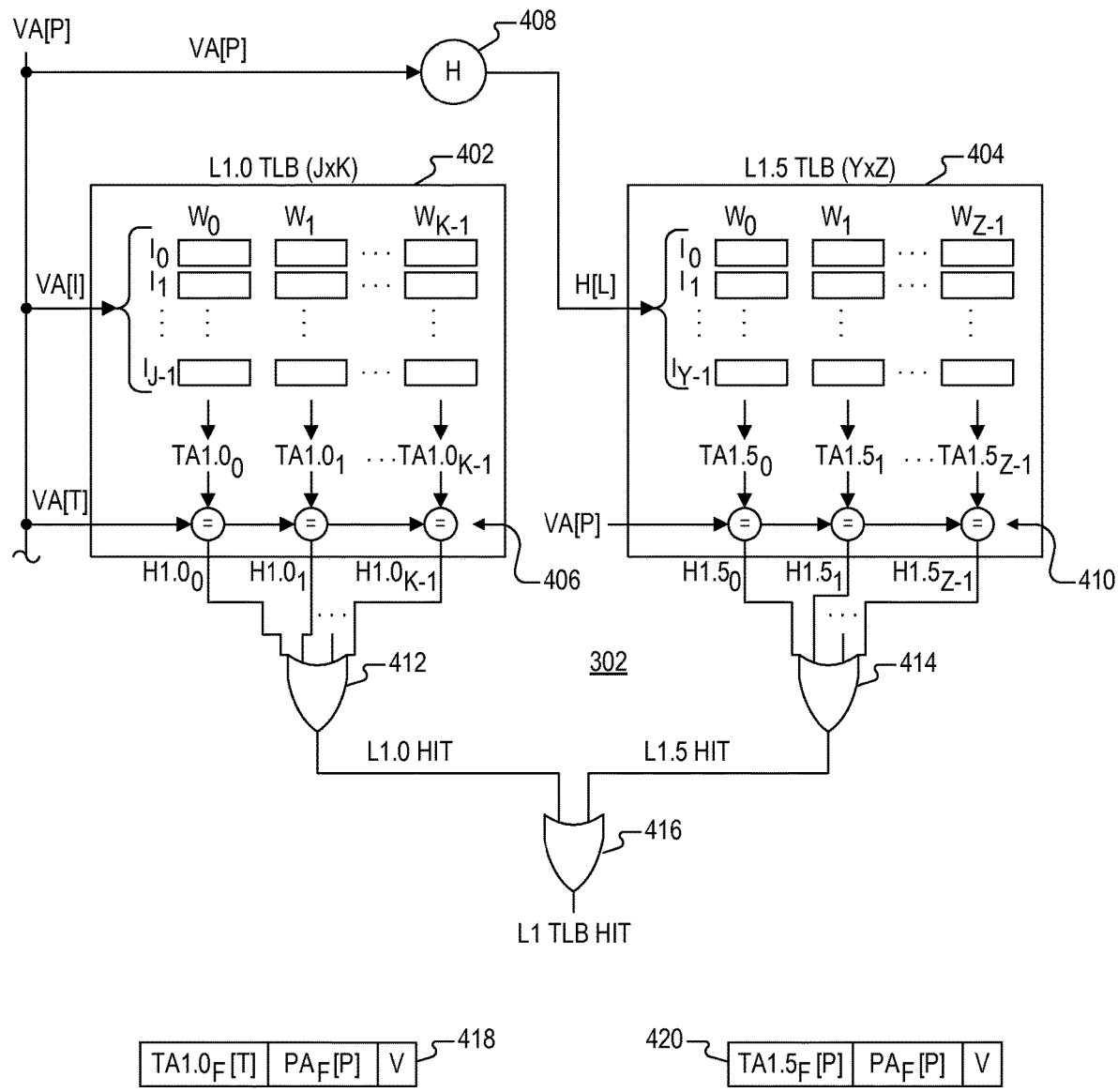
FIG. 4 is a block diagram illustrating the L1 TLB of FIG. 3 implemented according to one embodiment of the present invention.

FIG. 4 is a block diagram illustrating the L1 TLB 302 implemented according to one embodiment of the present invention. The L1 TLB 302 includes a first or primary TLB, denoted L1.0 TLB 402, and an overflow TLB, denoted L1.5 TLB 404 (in which the notations "1.0" and "1.5" are used to distinguish between each other and between the overall L1 TLB 302). In one embodiment, both TLBs 402 and 404 are set-associative cache arrays including multiple sets and ways, in which the L1.0 TLB 402 is a J×K array including J sets (indexed $I_0$ to $I_{J-1}$) and K ways (indexed $W_0$ to $W_{K-1}$), and L1.5 TLB is an Y×Z array including Y sets (indexed $I_0$ to $I_{Y-1}$) and K ways ($W_0$ to $W_{Z-1}$), and in which J, K, Y and Z are each integers greater than one. A virtual address to a "page" of information stored in the system memory 118, denoted VA[P], is used for accessing each location of the L1.0 TLB 402. The "P" denotes a page of information including only the upper bits of the full virtual address sufficient to address each page. For example, if a page of information has a size of $2^{12}$=4,096 (4K), then lower 12 bits [11 . . . 0] are discarded so that VA[P] only includes the remaining upper bits.

A lower sequential number of bits "I" of the VA[P] address (just above the discarded lower bits of the full virtual address) are used as an index VA[I] to address a selected set of the L1.0 TLB 402. The number of index bits "I" for the L1.0 TLB 402 is determined as $LOG_2(J)=I$. For example, if the L1.0 TLB 402 has 16 sets, then the index address VA[I] is the lowest 4 bits of the page address VA[P]. The remaining upper bits "T" of the VA[P] address are used as a tag value VA[T] for comparing to the tag values of each of the ways of the selected set using a set of comparators 406 of the L1.0 TLB 402. In this manner, the index VA[I] selects one set or row of the entries in the L1 TLB 402, and the selected tag value of each of the K ways of the selected set, shown as $TA1.0_0, TA1.0_1, \ldots, TA1.0_{K-1}$, are each compared with the tag value VA[T] by the comparators 406 for determining a corresponding set of hit bits $H1.0_0, H1.0_1, \ldots, H1.0_{K-1}$.

The L1.5 TLB 404 is indexed in a different manner. VA[P] is provided to an input of a hash generator 408, which outputs a corresponding hash index H[L]. The hash generator 408 may be located at any suitable location. In one embodiment, the hash generator 408 may conveniently be located within the L1 TLB 302. In another embodiment, the load and store pipes 212, 214 perform hash functions for other purposes, in which the hash generator 408 or its functions may be located in both of the load and store pipes 212, 214. Although all of the bits of VA[P] may be subject to the hash function performed by the hash generator 408, typically a subset of the bits of VA[P] are used to generate the hash index H[L]. Although one or more of the bits of the index VA[I], which are the lowest bits of VA[P], may be used for the hash function, the hash function typically reduces a larger number of bits for generating the hash value, so that higher bits may be used exclusively or in addition. In one embodiment, the VA[I] bits are not used for the hash function in favor of selected higher bits of VA[P]. Although any given bit of the hash index H[L] may be derived from a single bit of VA[P], typically two or more bits of VA[P] are used to develop one of the hash index H[L] bits.

The hash function may be any known hash function for generating the hash index H[L]. In one embodiment, for example, the exclusive-OR logic function may be applied to selected bits of VA[P] to generate the bits of the H[L] index. The selected bits of VA[P] and the hash function may be configured to optimize distribution of victims evicted from the L1.0 TLB 402 into the L1.5 TLB 404. The number of index bits "L" for the L1.5 TLB 404 is determined as $LOG_2(Y)=L$. For example, if the L1.5 TLB 404 also has 16 sets (i.e., J=Y), then the hash address H[L] includes 4 bits (in which L=I). It is noted, however, that the number of sets Y of the L1.5 TLB 404 may be different than the number of sets J of the L1.0 TLB 402.

Since the lower bits of VA[P] are not directly used as the index to the L1.5 TLB 404 so that it is indexed differently than the L1 TLB 402, the entire page address VA[P] may be used as the tag value for comparing to the tag values of each of the ways of the selected set using a set of comparators 410 of the L1.5 TLB 404. In this manner, index H[L] selects one set or row of the entries in the L1.5 TLB 404, and the selected tag values of each of the Z ways of the selected set, shown as $TA1.5_0, TA1.5_1, \ldots, TA1.5_{Z-1}$, are compared with the tag address VA[P] by the comparators 410 for determining a corresponding set of hit bits $H1.5_0, H1.5_1, \ldots, H1.5_{Z-1}$.

The hit bits $H1.0_0, H1.0_1, \ldots, H1.0_{K-1}$ of the L1.0 TLB 402 are provided to corresponding inputs of a K-input logic OR gate 412 for providing a hit signal L1.0 HIT indicating a hit within the L1.0 TLB 402 when any one of the selected tag values $TA1.0_0, TA1.0_1, \ldots, TA1.0_{K-1}$ is equal to the tag value VA[T]. Also, the hit bits $H1.5_0, H1.5_1, \ldots, H1.5_{Z-1}$ of the L1.5 TLB 404 are provided to corresponding inputs of a Z-input logic OR gate 414 for providing a hit signal L1.5 HIT indicating a hit within the L1.5 TLB 404 when any one of the selected tag values $TA1.5_0, TA1.5_1, \ldots, TA1.5_{Z-1}$ is equal to the tag value VA[P]. The L1.0 HIT signal and the L1.5 HIT signal are provided to the inputs of a 2-input logic OR gate 416 providing a hit signal L1 TLB HIT. Thus, L1 TLB HIT indicates a hit within the overall L1 TLB 302.

Each entry of the L1.0 cache 402 has the form illustrated by entry 418. Each entry stores a tag field $TA1.0_F[T]$ (subscript "F" denoting a field) for storing a tag value having the same number of tag bits "T" as the tag value VA[T] for comparison by a corresponding one of the comparators 406. Each entry includes a corresponding physical page field $PA_F[P]$ for storing a physical page address for accessing a corresponding page in the system memory 118. Each entry includes a valid field "V" including one or more bits indicating whether the entry is currently valid. A replacement vector (not shown) may be provided for each set used for determining a replacement policy. For example, if all of the ways of a given set are valid and a new entry is to replace one of the entries in the set, then the replacement vector is used to determine which of the valid entries to evict. The evicted data is then transferred to and stored within the L1.5 cache 404. In one embodiment, for example, the replacement vector is implemented according to a least recently used (LRU) policy such that the least recently used entry is targeted for eviction and replacement. The illustrated entry format may include additional information (not shown), such as status information or the like for the corresponding page.

Each entry of the L1.5 cache 404 has the form illustrated by entry 420. Entry 420 is substantially similar to the entry 418, except that the tag field is instead $TA1.5_F[P]$ for storing a tag value with having a full page address with P bits. In this manner, the tag field in the entry 420 for the L1.5 TLB 404 stores somewhat larger tag values than the tag field in the in the entry 418 for the L1.0 TLB 402. The comparators 410 are thus implemented as slightly larger comparators for comparing a greater number of bits. The illustrated entry format may include additional information (not shown), such as status information or the like for the corresponding page.

The L1.0 TLB 402 and the L1.5 TLB 404 are accessed at the same time, or during the same clock cycle, so that the collective entries of both TLBs are searched together. When a hit occurs within the L1 TLB 302 (L1 TLB HIT), then the corresponding physical address entry PA[P] is retrieved from the corresponding entry within either the L1.0 TLB 402 or the L1.5 TLB 404. Since the L1.5 TLB 404 is indexed in a different manner than the L1.0 TLB 402 in which the distribution of the hash index H[L] is different than the distribution of the index VA[I], the overall utilization of the combined size of the L1 TLB 302 (L1 and L1.5) is greater than a single larger TLB with the same number of entries. In a conventional TLB configuration, certain sets are overused while others are underused based on a singular indexing scheme. The use of a different index scheme for the L1.5 TLB 404 improves overall utilization so that the L1 TLB 302 appears as a larger array with a greater number of entries than it actually has. The L1.5 TLB 404 also serves as an overflow TLB in that victims evicted from the L1.0 TLB 402 are used to populate the L1.5 TLB 404 as described herein. As previously described, the hashing function employed by the hash generator 408 increases the likelihood that values evicted from a given set of the L1.0 TLB 402 will be stored in a different set of the L1.5 TLB 404 to improve set utilization of the overall L1 TLB 302. In this manner, the overall L1 TLB 302 generally has a greater performance than one larger TLB of having the same number of entries.

Figure 5:
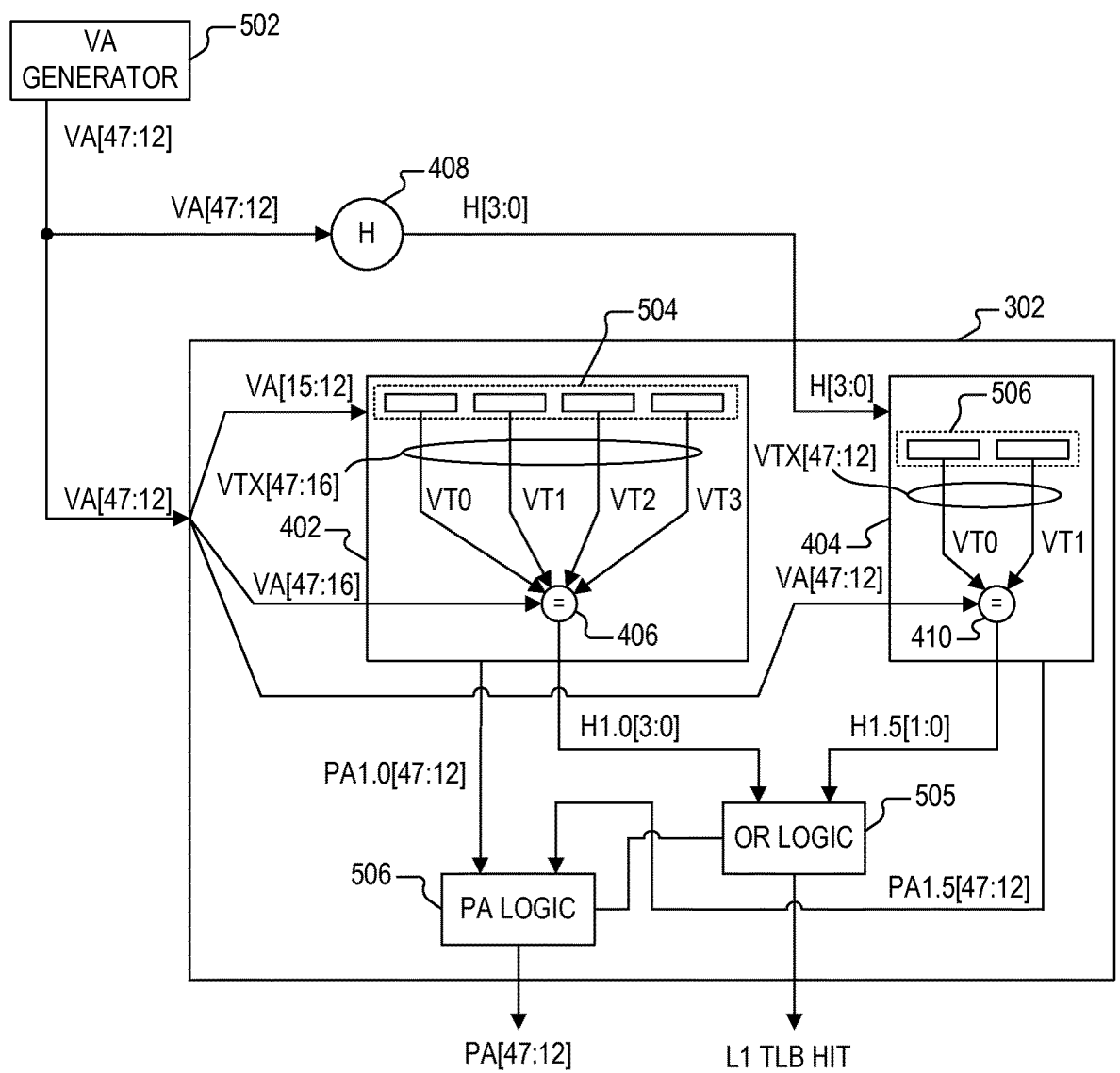
FIG. 5 is a block diagram illustrating the L1 TLB of FIG. 3 according to a more specific embodiment including a 16 set by 4 way (16×4) primary L1.0 array, and 16 set by 2 way (16×2) overflow L1.5 array.

FIG. 5 is a block diagram illustrating the L1 TLB 302 according to a more specific embodiment, in which J=Y=16, K=4, and Z=2 so that the L1.0 TLB 402 is a 16 set by 4 way array (16×4) and the L1.5 TLB 404 is a 16 set by 2 way array (16×2). Also, the virtual address is 48 bits, denoted VA[47: 0], and the page size is 4K. A virtual address generator 502 within both the load and store pipes 212, 214 provides the upper 36 bits of the virtual address, or VA[47:12], in which the lower 12 bits are discarded since addressing a 4K page of data. In one embodiment, the VA generator 502 performs an add calculation to provide the virtual address which is used as a search address for the L1 TLB 302. VA[47:12] is provided to inputs of the hash generator 408 and to inputs of the L1 TLB 302.

The lower 4 bits of the virtual address form the index VA[15:12] provided to the L1.0 TLB 402 for addressing one of the 16 sets, shown as a selected set 504. The remaining higher bits of the virtual address form the tag value VA[47: 16] which is provided to inputs of the comparators 406. The tag values VT0-VT3 within each entry of the 4 ways of the selected set 504, each having the form VTX[47:16], are provided to respective inputs of the comparators 406 for comparing with the tag value VA[47:16]. The comparators 406 output four hit bits H1.0[3:0]. If there is a hit in any of the four selected entries, then the corresponding physical address PA1.0[47:12] is also provided as an output of the L1.0 TLB 402.

The hash index H[3:0] is provided to the L1.5 TLB 404 for addressing one of the 16 sets, shown as a selected set 506. The virtual address bits VA[47:12] form the tag value provided to inputs of the comparators 410. The tag value VT0-VT1 within each entry of the 4 ways of the selected set 506, each having the form VTX[47:12], are provided to respective inputs of the comparators 410 for comparing with the tag value VA[47:12]. The comparators 410 output two hit bits H1.5[1:0]. If there is a hit in either of the two selected entries, then the corresponding physical address PA1.5[47: 12] is also provided as an output of the L1.5 TLB 404.

The hit bits H1.0[3:0] and H1.5[1:0] are provided to respective inputs of OR logic 505, representing the OR gates 412, 414 and 416, which outputs the hit bit L1 TLB HIT for the L1 TLB 302. The physical addresses PA1.0[47:12] and PA1.5[47:12] are provided to respective inputs of PA logic 506, which outputs the physical address PA[47:12] of the L1 TLB 302. The PA logic 506 may be configured as select or multiplexer (MUX) logic or the like for selecting one of the physical address of the L1.0 and L1.5 TLBs 402, 404. If L1 TLB HIT is not asserted indicating a MISS for the L1 TLB 302, then the corresponding physical address PA[47:12] is ignored or otherwise discarded as invalid.

The L1 TLB 302 shown in FIG. 5 includes 16×4 (L1.0)+ 16×2 (L1.5) entries for a total of 96 entries. A prior conventional configuration for the L1 TLB was configured as a 16×12 array for a total of 192 entries, which is more than twice the size of the L1 TLB 302. The hashing function used to generate the hash index H[3:0] provides a different distribution scheme as compared to the distribution scheme provided by the index VA[15:12], so that utilization of the sets and ways of the L1 TLB 302 is improved relative to the conventional configuration. More specifically, the hash index, on the average, selects a different set for storage of an entry in the L1.5 TLB 404 than the set within the L1.0 TLB 402 from which the entry was evicted. For certain program or operating system configurations, an improvement of about 50-60% may be achieved.

Figure 6:
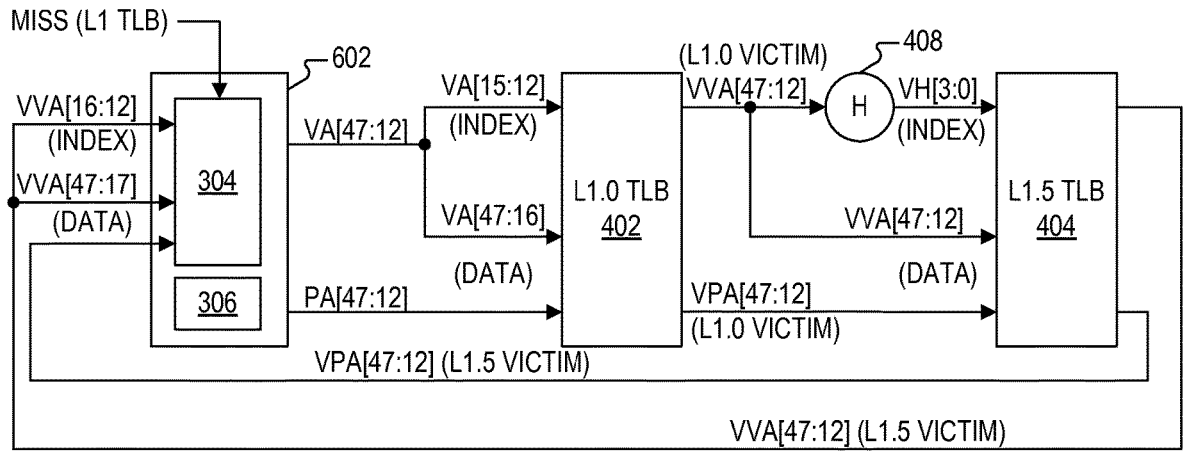
FIG. 6 is a block diagram of an eviction process according to one embodiment using the L1 TLB configuration of FIG. 5.

FIG. 6 is a block diagram of an eviction process according to one embodiment using the L1 TLB 302 configuration of FIG. 5. The L2 TLB 304 and the tablewalk engine 306 are shown collectively within a block 602. When a miss occurs in the L1 TLB 302 as shown in FIG. 3, a MISS indication is provided to the L2 TLB 304. The lower bits of the virtual address invoking the miss are applied as an index to the L2 TLB 304 to determine whether the corresponding physical address is stored therein. Also, a tablewalk is pushed to the tablewalk engine 306 using the same virtual address. Either the L2 TLB 304 or the tablewalk engine 306 returns with the virtual address VA[47:12] along with the corresponding physical address PA[47:12]. The lower 4 bits of the virtual address VA[15:12] are applied as the index to the L1.0 TLB 402, and the remaining upper bits of the virtual address VA[47:16] and the corresponding returned physical address PA[47:12] are stored in an entry within the L1.0 TLB 402. As shown in FIG. 4, the VA[47:16] bits form the new tag value TA1.0 and the physical address PA[47:12] forms the new PA[P] page value stored within the accessed entry. The entry is marked as valid according to the applicable replacement policy.

The index VA[15:12] provided to the L1.0 TLB 402 addresses a corresponding set within the L1.0 TLB 402. If there is at least one invalid entry (or way) of the corresponding set, then the data is stored within the otherwise "empty" entry without causing a victim. If, however, there are no invalid entries, then one of the valid entries is evicted and replaced with the data, and the L1.0 TLB 402 outputs the corresponding victim. The determination of which valid entry or way to replace with the new entry is based on a replacement policy, such as according to the least-recently used (LRU) scheme, a pseudo-LRU scheme, or any suitable replacement policy or scheme. The victim of the L1.0 TLB 402 includes a victim virtual address VVA[47:12] and a corresponding victim physical address VPA[47:12]. The evicted entry from the L1.0 TLB 402 includes the previously stored tag value (TA1.0), which is used as the upper bits VVA[47:16] of the victim virtual address. The lower bits VVA[15:12] of the victim virtual address are the same as the index of the set from which the entry was evicted. For example, the index VA[15:12] may be used as VVA[15:12], or else corresponding internal index bits of the set from which the tag value was evicted may be used. The tag value and the index bits are appended together to form the victim virtual address VVA[47:12].

As shown in FIG. 6, the victim virtual address VVA[47: 12] is applied to the inputs of the hash generator 408, which outputs a corresponding victim hash index VH[3:0]. VH[3: 0] is applied to the index input of the L1.5 TLB 404 and thus used to address a set within the L1.5 TLB 404. If there is at least one invalid entry (or way) of the addressed set within the L1.5 TLB 404, then the virtual address VVA[47:12] and the corresponding physical address PA[47:12] are stored as the data in the invalid entry without causing a victim, and the entry is marked as valid.

When, however, there are no invalid entries of the set addressed within the L1.5 TLB 404 addressed by VH[3:0], then the previously valid entry is evicted and the new entry, including VVA[47:12] and VPA[47:12], which was evicted from the L1.0 TLB 402, is stored in the corresponding entry of the L1.5 TLB 404. The L1.5 TLB 404 victim includes a tag value used as another victim virtual address VVA[47: 12], and includes a corresponding physical address victim VPA[47:12] in a similar manner as the victim of the L1.0 TLB 402. In the illustrated configuration, the L2 TLB 304 is larger and includes 32 sets, so that the lower five bits of the victim virtual address VVA[16:12] from the L1.5 TLB 404 are provided as the index to the L2 TLB 304 for accessing a corresponding set. The remaining upper victim virtual address bits VVA[47:17] and the victim physical address VPA[47:12] are provided as the data to the L2 TLB 304. These data values are stored in an invalid entry of the indexed set within the L2 TLB 304, if any, or otherwise in a selected valid entry evicting a previously stored entry. Any entry evicted from the L2 TLB 304 may simply be discarded in favor of the new data.

Figure 7:
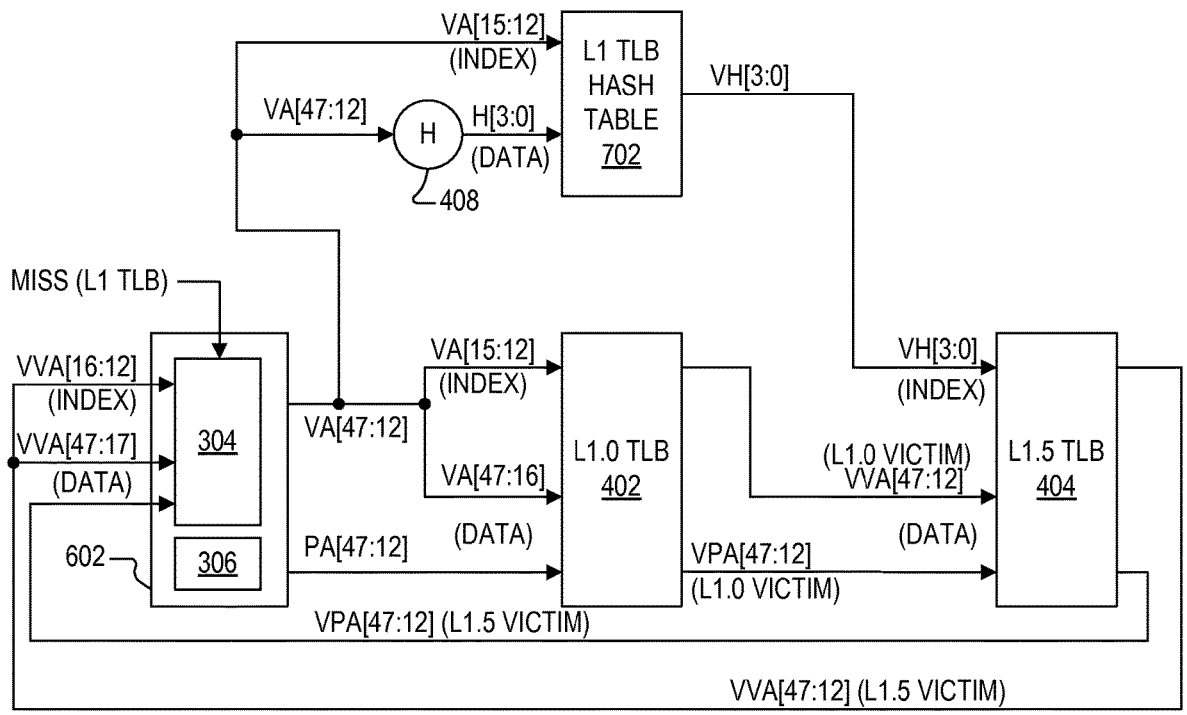
FIG. 7 is a block diagram of an eviction process according to another embodiment using the L1 TLB configuration of FIG. 5.

FIG. 7 is a block diagram of an eviction process according to another embodiment using the L1 TLB 302 configuration of FIG. 5. The eviction process is substantially similar as that shown in FIG. 6 in which similar items and blocks assume identical reference numerals. In this case, however, an L1 TLB hash table 702 is included, which stores hash indexes for all of the currently valid values in the L1.0 TLB 402. Thus, the L1 TLB hash table 702 is a 16×4 array of hash index values when the L1.0 TLB 402 is a 16×4 cache array. Operation is similar, except that the virtual address VA[47:12] from either the L2 TLB 304 or the tablewalk engine 306 is provided directly to the input of the hash generator 408, which outputs a corresponding hash index H[3:0]. The lower 4 bits of the virtual address VA[15:12], which are applied as the index to the L1.0 TLB 402, are also applied as an index to the hash table 702. The hash index H[3:0] at the output of the hash generator 408 is provided as the corresponding data stored at the location identified by the virtual address index VA[15:12] within the hash table 702. When a victim is evicted from the L1.0 TLB 402 in a similar manner previously described, a corresponding victim hash index VH[3:0] is also evicted from the L1 TLB hash table 702 and applied as the index to the L1.5 TLB 404. The eviction process from the L1.5 TLB 404 to the L2 TLB 304 is the same as that described for FIG. 6.

The eviction process of FIG. 6 has the advantage of avoiding the use of the L1 TLB hash table 702, which consumes additional memory space. Since the hash table 702 only stores index values, it consumes significantly less space than the L1.0 TLB 402. In the alternative embodiment of FIG. 7 using the hash table 702, it may be desired to perform the eviction process from the L1.0 TLB 402 to the L1.5 TLB 404 in a single clock cycle. The hash generator 408, placed between the L1.0 TLB 402 and the L1.5 TLB 404 in the configuration of FIG. 6, inserts latency or otherwise creates offset timing that may not allow the eviction process to complete in one cycle in certain configurations. In this manner, the eviction process embodiment of FIG. 7 has the advantage of faster victim process timing of the L1 TLB 302, such as within a single clock cycle.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like. Also, although the present invention is illustrated by way of TLB arrays and the like, the concepts may equally be applied to any multiple level cache scheme in which a first cache array is indexed differently than a second cache array. The different indexing scheme provides increased utilization of cache sets and ways and thus improved performance.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A cache memory system, comprising:
    a primary cache memory that comprises a first plurality of storage locations and receives a search address, wherein said search address includes a plurality of bits, a first set of bits among said plurality of bits of said search address is received as a primary index, and said primary cache memory is addressed by said primary index;
    an overflow cache memory that comprises a second plurality of storage locations and that operates as an eviction array for said primary cache memory, wherein said overflow cache memory is addressed by a hash index generated by a hash function applied to a second set of bits among said plurality of bits of said search address;
    a hash generator that performs said hash function; and
    a hash table that only stores hash index values and stores a hash index for each valid entry stored in said primary cache memory;
    wherein said primary cache memory and said overflow cache memory are searched together at the same time using said search address for a stored value that corresponds with said search address;
    wherein a retrieved entry for storage into said primary cache memory includes a tag value and said primary index, wherein said retrieved entry is provided to an input of said hash generator, wherein said primary index is provided to an index input of said hash table and to an index input of said primary cache memory, wherein said hash table outputs a corresponding hash index, and wherein said tag value is provided to a data input of said primary cache memory;
    wherein said primary cache memory is operative to evict a tag value from an entry within said primary cache memory and to form a victim search address by appending said evicted tag value with an index value of said entry;
    wherein said hash generator is configured to generate a new hash index using said retrieved entry, and wherein said hash table is configured to store said new hash index at a location addressed by said primary index and to evict a victim hash index; and
    wherein said overflow cache memory is configured to store said victim search address at a location addressed by said victim hash index, and wherein eviction process from the primary cache memory to the overflow cache memory is performed in a single clock cycle.

2. The cache memory system of claim 1, wherein said primary cache memory and said overflow cache memory are organized as a common number of sets, and wherein said hash index causes a victim evicted from a set in said primary cache memory to be stored at a different numbered set within said overflow cache memory.

3. The cache memory system of claim 1, wherein a plurality of search addresses generate a plurality of primary indexes and wherein said plurality of search addresses cause said hash function to generate a corresponding plurality of hash indexes including at least one hash index that is different from said plurality of primary indexes.

4. The cache memory system of claim 1, wherein said first set of bits includes the least signification bit of the search address.

5. The cache memory system of claim 1, wherein said primary cache memory and said overflow cache memory each comprise a translation lookaside buffer for storing physical addresses of a main system memory for a microprocessor.

6. The cache memory system of claim 1, wherein said primary cache memory comprises an array of 16 sets by 4 ways of storage locations, and wherein said overflow cache memory comprises a cache array of 16 sets by 2 ways of storage locations.

7. The cache memory system of claim 1, further comprising:
said primary cache memory comprising a first plurality of ways and a corresponding first plurality of comparators providing a first plurality of hit signals;
said overflow cache memory comprising a second plurality of ways and a corresponding second plurality of comparators providing a second plurality of hit signals; and
logic that combines said first plurality of hit signals and said second plurality of hit signals into one hit signal for said cache memory system.

8. The cache memory system of claim 1, further comprising:
a hash generator that performs said hash function;
wherein said search address is provided to an input of said hash generator and wherein said search address includes said primary index which is provided to an index input of said primary cache memory; and
wherein said hash generator generates said hash index and provides said hash index to an index input of said overflow cache memory, and wherein said primary cache memory and said overflow cache memory collectively determine a cache hit indication in response to said search address.

9. The cache memory system of claim 1, wherein said primary cache memory is organized as a number of sets and a plurality of ways, wherein said overflow cache memory is organized as said number of sets, and wherein said hash function causes a plurality of victims evicted from said plurality of ways of a given set of said primary cache memory to be distributed to a plurality of different sets of said overflow cache memory.

10. A microprocessor, comprising:
an address generator that generates a virtual address that includes a plurality of bits, wherein a first set of bits among said plurality of bits of said search address forms a primary index;
a hash generator that converts all of said plurality of bits of said virtual address into a hash index; and
a cache memory system, comprising:
a primary cache memory that is addressed by said primary index;
an overflow cache memory that is addressed by said hash index;
a hash generator that performs said hash function; and
a hash table that only stores hash index values and stores a hash index for each valid entry stored in said primary cache memory;
wherein said primary cache memory and said overflow cache memory are searched together at the same time using said primary index and said hash index, respectively, and wherein said overflow cache memory forms an eviction array for said primary cache memory;
wherein a retrieved entry for storage into said primary cache memory includes a tag value and said primary index, wherein said retrieved entry is provided to an input of said hash generator, wherein said primary index is provided to an index input of said hash table and to an index input of said primary cache memory, wherein said hash table outputs a corresponding hash index, and wherein said tag value is provided to a data input of said primary cache memory;
wherein said primary cache memory is operative to evict a tag value from an entry within said primary cache memory and to form a victim search address by appending said evicted tag value with an index value of said entry;
wherein said hash generator is configured to generate a new hash index using said retrieved entry, and wherein said hash table is configured to store said new hash index at a location addressed by said primary index and to evict a victim hash index; and
wherein said overflow cache memory is configured to store said victim search address at a location addressed by said victim hash index, and wherein eviction process from the primary cache memory to the overflow cache memory is performed in a single clock cycle.

11. The microprocessor of claim 10, further comprising:
said primary cache memory comprising a first plurality of ways and a corresponding first plurality of comparators providing a first plurality of hit signals;
said overflow cache memory comprising a second plurality of ways and a corresponding second plurality of comparators providing a second plurality of hit signals; and
logic that combines said first plurality of hit signals and said second plurality of hit signals into one hit signal for said cache memory system.

12. The microprocessor of claim 10, wherein said cache memory system comprises a level one translation lookaside buffer for storing a plurality of physical addresses that correspond with a plurality of virtual addresses.

13. The microprocessor of claim 12, further comprising:
a tablewalk engine that accesses system memory when a miss occurs in said cache memory system; and
wherein said cache memory system includes a level two translation lookaside buffer that forms another eviction array for said overflow cache memory, and that wherein said level two translation lookaside buffer is searched when a miss occurs in said primary cache memory and said overflow cache memory.

14. The microprocessor of claim 10, wherein said primary cache memory comprises a number of sets and a plurality of ways, wherein said overflow cache memory comprises said number of sets, and wherein said plurality of ways of a given set of said primary cache memory are distributed to different sets of said overflow cache memory.

15. The microprocessor of claim 10, wherein the first set of bits includes the least signification bit of the search address.

16. A method of caching data, comprising:
generating a virtual address which comprises a plurality of bits;
using a first set of bits among the plurality of bits of the virtual address as a primary index, wherein a primary cache memory is addressed by the primary index;
generating a hash index from all of the plurality of bits of the virtual address, wherein an overflow cache memory is addressed by the hash index;
searching a primary cache using the primary index and searching an overflow cache of the primary cache using the hash index at the same time;
performing said hash function by a hash generator; and
only storing hash index values and storing a hash index for each valid entry stored in said primary cache memory by a hash table;
wherein a retrieved entry for storage into said primary cache memory includes a tag value and said primary index, wherein said retrieved entry is provided to an input of said hash generator, wherein said primary index is provided to an index input of said hash table and to an index input of said primary cache memory, wherein said hash table outputs a corresponding hash index, and wherein said tag value is provided to a data input of said primary cache memory;
wherein said primary cache memory is operative to evict a tag value from an entry within said primary cache memory and to form a victim search address by appending said evicted tag value with an index value of said entry;
wherein said hash generator is configured to generate a new hash index using said retrieved entry, and wherein said hash table is configured to store said new hash index at a location addressed by said primary index and to evict a victim hash index; and
wherein said overflow cache memory is configured to store said victim search address at a location addressed by said victim hash index, and wherein eviction process from the primary cache memory to the overflow cache memory is performed in a single clock cycle.

17. The method of claim 16, further comprising:
generating a first hit indication based on said searching the primary cache;
generating a second hit indication based on said searching the overflow cache;
combining the first and second hit indications to provide a single hit indication.

18. The method of claim 16, further comprising:
evicting a tag from the primary cache;
appending an index that addresses a storage location in the primary cache from which the tag was evicted to the tag to generate a victim address;
generating a victim hash index from the victim address; and
storing the victim address in the overflow cache at a location addressed by the victim hash index.

19. The method of claim 16, further comprising:
receiving an address for storing a value into the primary cache;
using first selected bits of the received address as a retrieve primary index and using second selected bits of the received address as a tag address, and storing the tag address into the primary cache at the retrieve primary index;
generating a victim hash index from the received address; and
storing the victim hash index into a hash table at an address indicated by the retrieve primary index.

20. The method of claim 19, further comprising:
evicting a tag from the primary cache corresponding to the retrieve primary index;
evicting a victim hash address from the hash table corresponding to the retrieve primary index;
appending an index to the evicted tag to provide a victim address; and
storing the victim address into a location of the overflow cache addressed by the victim hash address.

21. The method of claim 16, wherein the first set of bits includes the least signification bit of the virtual address.

* * * * *